(12) United States Patent
Kim et al.

(10) Patent No.: US 11,629,437 B2
(45) Date of Patent: Apr. 18, 2023

(54) POLYURETHANE UREA ELASTIC YARN HAVING IMPROVED DYEABILITY AND MANUFACTURING METHOD THEREFOR

(71) Applicant: HYOSUNG TNC CORPORATION, Seoul (KR)

(72) Inventors: Tae Heon Kim, Seoul (KR); Ho Young Jeong, Seoul (KR); Yeon Soo Kang, Seoul (KR)

(73) Assignee: Hyosung TNC Corporation, Seoul (KR)

( * ) Notice: Subject to any disclaimer, the term of this patent is extended or adjusted under 35 U.S.C. 154(b) by 354 days.

(21) Appl. No.: 16/769,215

(22) PCT Filed: Sep. 21, 2018

(86) PCT No.: PCT/KR2018/011269
§ 371 (c)(1),
(2) Date: Jun. 2, 2020

(87) PCT Pub. No.: WO2019/132182
PCT Pub. Date: Jul. 4, 2019

(65) Prior Publication Data
US 2021/0172090 A1  Jun. 10, 2021

(30) Foreign Application Priority Data
Dec. 27, 2017 (KR) .................. 10-2017-0181583

(51) Int. Cl.
| | | |
|---|---|---|
| *C08G 18/12* | (2006.01) | |
| *D01F 6/70* | (2006.01) | |
| *C08G 18/48* | (2006.01) | |
| *D01D 5/04* | (2006.01) | |
| *D01F 1/10* | (2006.01) | |
| *D04B 1/18* | (2006.01) | |

(52) U.S. Cl.
CPC .............. *D01F 6/70* (2013.01); *C08G 18/12* (2013.01); *C08G 18/4854* (2013.01); *D01D 5/04* (2013.01); *D01F 1/10* (2013.01); *D04B 1/18* (2013.01); *D10B 2401/061* (2013.01); *D10B 2401/14* (2013.01)

(58) Field of Classification Search
CPC ..... D01F 6/70; D01F 1/10; D01F 1/06; D01F 1/04; C08G 18/12; C08G 18/4854; C08G 18/4808; C08G 18/4833; C08G 18/7671; D01D 1/02; D01D 5/04; D04B 1/18; D10B 2401/061; D10B 2401/14; D10B 2331/10; D10B 2331/12
USPC ......................................................... 528/61
See application file for complete search history.

(56) References Cited

U.S. PATENT DOCUMENTS

| | | | | |
|---|---|---|---|---|
| 5,616,676 A | * | 4/1997 | Katsuo ...................... | D01F 6/70 528/61 |
| 6,403,216 B1 | | 6/2002 | Doi et al. | |
| 6,468,652 B1 | * | 10/2002 | Tsuru .................. | C08G 18/4854 428/394 |
| 7,838,617 B2 | | 11/2010 | Houser et al. | |
| 8,597,787 B2 | | 12/2013 | Tanaka et al. | |
| 2009/0286441 A1 | * | 11/2009 | Yamamoto ................ | D01F 6/94 528/367 |
| 2010/0130083 A1 | | 5/2010 | Tanaka et al. | |
| 2016/0122906 A1 | * | 5/2016 | Lee .......................... | D01F 6/70 428/397 |

FOREIGN PATENT DOCUMENTS

| | | |
|---|---|---|
| CN | 104790057 A | 7/2015 |
| EP | 2573215 A1 | 3/2013 |
| JP | 2001-098423 A | 4/2001 |
| JP | 2002-212834 A | 7/2002 |
| JP | 2008-519179 A | 6/2008 |
| JP | 2008-169536 A | 7/2008 |
| JP | 2009-191415 A | 8/2009 |
| JP | 2014-531522 A | 11/2014 |
| KR | 10-1997-0027138 A | 6/1997 |
| KR | 10-0419762 B1 | 2/2004 |
| KR | 10-2007-0108494 A | 11/2007 |
| KR | 10-0903064 B1 | 6/2009 |
| KR | 10-1440650 B1 | 9/2014 |
| WO | WO 2006/052318 A1 | 5/2006 |
| WO | WO 2020/045727 A1 | 3/2020 |

OTHER PUBLICATIONS

Extended European Search Report, European Patent Office Application No. 18894556, dated Jul. 16, 2021, 5 pages.
Japanese Office Action, Japan Patent Office Application No. 2020-536510, dated Jul. 13, 2021, 10 pages.
PCT International Search Report, PCT/KR2018/011269, dated Jan. 8, 2019, 4 Pages.

* cited by examiner

*Primary Examiner* — Hannah J Pak
(74) *Attorney, Agent, or Firm* — Fenwick & West LLP

(57) ABSTRACT

The present invention relates to a polyurethane urea elastic yarn having improved dyeability and a manufacturing method therefor. Through a process of forming a prepolymer by mixing polyethyleneglycol with polyol and then adding diisocyanate to the same in a prepolymer manufacturing step during the manufacture of a polyurethane urea elastic yarn, the hydrophilicity of the polyurethane urea elastic yarn is improved such that the accessibility of an acid dye is enhanced, thereby enabling the dyeability of the polyurethane urea elastic yarn to be enhanced and an advantage of dye color deepening of a fabric, in which nylon and a polyurethane urea elastic yarn are knitted together, to be expected.

2 Claims, No Drawings

POLYURETHANE UREA ELASTIC YARN HAVING IMPROVED DYEABILITY AND MANUFACTURING METHOD THEREFOR

TECHNICAL FIELD

The present disclosure relates to a polyurethane urea elastic yarn having improved dyeability and a method for manufacturing the same, and in particular, to a polyurethane urea elastic yarn having improved dyeability for an acid dye and a method for manufacturing the same.

BACKGROUND ART

A polyurethane fiber having elastic properties has been widely used in the textile industry. A 'spandex' fiber is used as a general term meaning such an elastic fiber, and generally refers to a synthetic fiber in which a polyurethane bond is 85% or more in the structure forming the fiber.

Such a polyurethane fiber is generally prepared by a polymerization reaction first of reacting a polyol, such as a high molecular weight did compound with an excess diisocyanate compound to obtain a prepolymer having an isocyanate group on both ends of the polyol, and a polymerization reaction second of dissolving the prepolymer in a proper solvent and then adding a diamine-based or did-based chain extender to the solution for reacting.

A polyurethane fiber may be used in combination with various other fibers such as acryl, wool, cotton and silk, and have been generally used for purposes requiring elasticity such as underwear, swimwear and stockings.

Due to such unique properties having elasticity, a polyurethane fiber has been actively used in various applications, and as the application expands, new additional properties have been continuously required for existing polyurethane fibers. A number of polyurethane fibers having more enhanced heat resistance and resilience have been developed so far, and demands for polyurethane fibers having high thermosetting properties and polyurethane fibers having enhanced dyeability are also gradually increasing.

A polyurethane fiber generally has a problem of poor dyeability, and general technologies for enhancing dyeability for an acid dye include 1) a method of introducing a tertiary nitrogen atom into a polyurethane polymer chain (Japanese Patent Publication No. S62-23097 B), 2) a method of introducing a salt of an organic acid or inorganic acid and a tertiary amine to a polyurethane polymer chain (Japanese Patent Publication No. S50-17520 B), 3) introducing a tertiary or quaternary nitrogen atom to an end of a polyurethane polymer chain (Japanese Patent Publication No. S44-16386 B), 4) a method of using a low molecular diamine as a chain extender (Japanese Patent Application Laid-Open Publication No. S59-108021 A), and the like.

However, gelation readily occurs in the reaction in the above methods 1) and 2), and the method 3) has a problem in that the amount of the introduced nitrogen atom is difficult to control. In addition, the method 4) of using a low molecular diamine as a chain extender may enhance dyeability, but has a problem of decreasing softness and elasticity.

In addition thereto, Korean Patent Application Laid-Open Publication Nos. 10-2009-0118997 A and 10-2005-0070652 A have tried to improve dyeability by dyeing with a specific blue acid dye containing a polymer having a maleimide structure formed with a maleimide unit or adding a talc compound, respectively, however, there is a limit to sufficiently enhance dyeability of polyurethane.

DISCLOSURE

Technical Problem

The present disclosure is directed to providing a polyurethane urea elastic yarn having improved dyeability for an acid dye, and a method for manufacturing the same.

Technical Solution

As a means to solve the above technical problem,
A polyurethane urea elastic yarn having improved dyeability for a dye according to one embodiment of the present disclosure is obtained by reacting,
(a) a polyol including a first polyol and a second polyol; (b) at least one of diisocyanates; (c) at least one of diamine chain extenders; and (d) at least one of amine chain terminators, wherein the second polyol is polyethylene glycol, and the first polyol and the second polyol are materials different from each other.

In addition, the second polyol is mixed in 5.0 mol % to 20.0 mol % with respect to the total amount of polyol.

In addition, the polyurethane urea elastic yarn has an amine-terminated number of 20.0 meq/kg to 45.0 meq/kg.

A method for manufacturing a polyurethane urea elastic yarn having improved dyeability according to the present disclosure includes,
(a) preparing a polyurethane prepolymer by bringing a polyol including a first polyol and a second polyol into contact with at least one of diisocyanates; (b) adding a solvent to the prepolymer in the step (a); (c) bringing the product in the step (b) into contact with at least one of diamine chain extenders and at least one of amine chain terminators; and (d) preparing a polyurethane urea elastic yarn by spinning the product in the step (c), wherein the second polyol is polyethylene glycol, and the first polyol and the second polyol are materials different from each other.

In addition, the second polyol is mixed in 5.0 mol % to 20.0 mol % with respect to the total amount of polyol.

In addition, the polyurethane urea elastic yarn has an amine-terminated number of 20.0 meq/kg to 45.0 meq/kg.

With respect to a fabric according to the present disclosure,
It is a fabric having enhanced dyeability for an acid dye by knitting the polyurethane urea elastic yarn according to one embodiment of the present disclosure and nylon.

Advantageous Effects

By mixing polyethylene glycol in a step of preparing a polyurethane prepolymer, accessibility of an acid dye to a polyurethane urea elastic yarn is enhanced by enhancing hydrophilicity of the polyurethane urea elastic yarn, and as a result, dyeability of the polyurethane urea elastic yarn for the acid dye can be enhanced, and an advantage of dye color deepening of a fabric obtained by knitting the polyurethane urea elastic yarn of the present disclosure with nylon can be expected as well.

MODE FOR DISCLOSURE

Hereinafter, the present disclosure will be described in detail.

The present disclosure relates to a polyurethane urea elastic yarn having improved dyeability, the polyurethane urea elastic yarn including a product obtained by reading (a) a polyol including a first polyol and a second polyol; (b) at least one of diisocyanates; (c) at least one of diamine chain extenders; and (d) at least one of amine chain terminators, wherein the second polyol is polyethylene glycol, and the first polyol and the second polyol are materials different from each other.

In addition, the present disclosure relates to a method for manufacturing a polyurethane urea elastic yarn having improved dyeability, the method including (a) preparing a polyurethane prepolymer by bringing a polyol including a first polyol and a second polyol into contact with at least one of diisocyanates; (b) adding a solvent to the prepolymer in the step (a); (c) bringing the product in the step (b) into contact with at least one of diamine chain extenders and at least one of amine chain terminators; and (d) preparing a polyurethane urea elastic yarn by spinning the product in the step (c), wherein the second polyol is polyethylene glycol, and the first polyol and the second polyol are materials different from each other.

In the present disclosure, the polyol includes a first polyol and a second polyol. In other words, a first polyol and a second polyol are mixed to be used as the polyol, and the first polyol and the second polyol are materials different from each other.

In the present disclosure, polytetramethylene ether glycol, polypropylene glycol, polycarbonatediol and the like may be used as the first polyol.

In the present disclosure, the second polyol is polyethylene glycol. Polyethylene glycol has excellent hydrophilicity, and therefore, hydrophilicity of the polyurethane urea elastic yarn is enhanced by mixing the polyethylene glycol in the step of preparing a polyurethane prepolymer, which resultantly enhances accessibility of an acid dye to the polyurethane urea elastic yarn, and dyeability of the polyurethane urea elastic yarn for the acid dye may be enhanced.

In the present disclosure, the polyethylene glycol is preferably mixed in 5.0 mol % to 20.0 mol % with respect to the total amount of polyol. When using the polyethylene glycol in less than 5.0 mol %, enhancement of dyeability for an acid dye may not be expected, and using the polyethylene glycol in greater than 20.0 mol % may twice serious decline in the properties of the elastic yarn and a decrease in the process applicability.

In the present disclosure, 4,4'-diphenylmethane diisocyanate, hexamethylene diisocyanate, toluene diisocyanate, butylene diisocyanate, hydrogenated p,p-methylene diisocyanate and the like may be used as the diisocyanate, and one or more compounds thereof may be used.

The polyol and the diisocyanate are brought into contact with each other to prepare a polyurethane prepolymer, and a solvent is added thereto. Herein, the solvent is preferably dimethylacetamide. After that, the result is brought into contact with at least one of chain extenders and at least one of chain terminators to prepare a polyurethane urea solution. The prepared polyurethane urea solution, a product, goes through a fiber spinning process such as dry spinning or melt spinning to prepare the polyurethane urea elastic yarn.

In the present disclosure, the chain extender is at least one of diamines. Examples of the usable diamine include hydrazine, ethylenediamine, 1,2-propanediamine, 1,3-propanediamine, 1,2-butanediamine (1,2-diaminobutane), 1,3-butanediamine (1,3-diaminobutane), 1,4-butanediamine (1,4-diaminobutane), 1,3-diamino-2,2-dimethylbutane, 4,4'-methylenebis-cyclohexylamine, 1-amino-3,3,5-trimethyl-5-aminomethylcyclohexane, 1,6-hexanediamine, 2,2-dimethyl-1,3-diaminopropane, 2,4-diamino-1-methylcyclohexane, N-methylaminobis(3-propylamine), 2-methyl-1,5-pentanediamine, 1,5-diaminopentane, 1,4-cyclohexanediamine, 1,3-diamino-4-methylcyclohexane, 1,3-cyclohexane-diamine, 1,1-methylene-bis(4,4'-diaminohexane), 3-aminomethyl-3,5,5-trimethylcyclohexane, 1,3-pentanediamine (1,3-diaminopentane), m-xylylenediamine and mixtures thereof, but are not limited thereto. Ethylenediamine is preferred as the chain extender.

In the present disclosure, the chain terminator is at least one of amines. Examples of the usable amine may include diethylamine, cyclohexylamine, n-hexylamine and mixtures thereof, but are not limited thereto. Diethylamine is preferred as the chain terminator.

In the polyurethane urea elastic yarn of the present disclosure, the yarn preferably has an amine-terminated number of 20.0 meq/kg to 45.0 meq/kg. The amine end of the yarn serves as a dyeing site bondable to a dye, and when the yarn has an amine-terminated number of less than 20.0 meg/kg, a sufficient dyeability enhancing effect may not be expected due to the lack of dyeing sites. In addition, when the yarn has an amine-terminated number of greater than 45.0 meq/kg, dyeability is sufficient, however, the amine-terminated number excessively increases, which may cause a serious problem in storage stability of a polymer.

In addition, in order to prevent discoloration and property decline of the polyurethane urea caused by ultraviolet rays, atmospheric smog, a heat treatment process associated with spandex processing, and the like, a sterically-hindered phenol-based compound, a benzofuranone-based compound, a semicarbazide-based compound, a benzotriazole-based compound, a polymeric tertiary amine stabilizer and the like may be properly combined and added to the spinning solution in the present disclosure. In addition to the above-mentioned components, pigments or dyes with a blue color, a complementary color of a yellow color, may be added to the spandex fiber of the present disclosure to reduce yellowishness of the yarn.

Furthermore, the polyurethane urea elastic yarn of the present disclosure may include additives such as titanium dioxide or magnesium stearate in addition to the above-described components.

The polyurethane urea elastic yarn of the present disclosure may be knitted with nylon to prepare a fabric, and such a knitted fabric has an excellent dye color deepening effect by having improved dyeability for an acid dye.

Hereinafter, the present disclosure will be specifically described with reference to examples, however, the following examples and experimental examples are just illustrating one embodiment of the present disclosure, and the scope of the present disclosure is not limited to the following examples and experimental examples.

Example 1

To 33.8 kg of polytetramethylene ether glycol (PTMG, molecular weight 1800), 5.0 mol % of polyethylene glycol (molecular weight 2000) was mixed, and after adding 8.8 kg of 4,4'-diphenylmethane diisocyanate thereto, the result was reacted while stirring for 120 minutes at 90° C. in a nitrogen gas stream to prepare a polyurethane prepolymer having isocyanate on both terminals. The prepolymer was cooled to room temperature, and 66.1 kg of dimethylacetamide was added thereto as a solvent to obtain a polyurethane prepolymer solution.

Subsequently, 1.1 kg of ethylenediamine as a chain extender and 0.1 kg of diethylamine as a chain terminator were dissolved in 15.6 kg of dimethylacetamide, and the result was added to the prepolymer solution at 10° C. or lower to obtain a polyurethane urea solution in which the polyurethane urea solution solid has an amine-terminated number of 63 meq/kg.

In addition, 1.5 weight % of triethylene glycol-bis-3-(3-tertiary-butyl-4-hydroxyphenyl)propionate as an antioxidant, 4 weight % of hydrotalcite ($Mg_4Al_2(OH)_{12}CO_3 \cdot 3H_2O$) coated with 1 weight % of melamine polyphosphate as an inorganic chlorine resistance agent, and 0.5 weight % of titanium dioxide as a light resistance agent were mixed to the polyurethane urea solution to prepare a polyurethane urea spinning solution.

The spinning solution obtained as above was spun at a rate of 900 m/min by dry spinning to manufacture a polyurethane urea elastic yarn with 40 denier, 3 filaments, and a yarn amine-terminated number of 33 meq/kg.

Example 2

In the process of preparing the prepolymer of Example 1, 10.0 mol % of polyethylene glycol (molecular weight 2000) was mixed to 32.0 kg of polytetramethylene ether glycol (PTMG, molecular weight 1800), and after adding 8.7 kg of 4,4'-diphenylmethane diisocyanate thereto, the result was reacted while stirring for 120 minutes at 90° C. in a nitrogen gas stream to prepare a polyurethane prepolymer having isocyanate on both terminals. The preparation process after that was the same as in Example 1.

Example 3

In the process of preparing the prepolymer of Example 1, 20.0 mol % of polyethylene glycol (molecular weight 2000) was mixed to 28.2 kg of polytetramethylene ether glycol (PTMG, molecular weight 1800), and after adding 8.7 kg of 4,4'-diphenylmethane diisocyanate thereto, the result was reacted while stirring for 120 minutes at 90° C. in a nitrogen gas stream to prepare a polyurethane prepolymer having isocyanate on both terminals. The preparation process after that was the same as in Example 1.

Comparative Example 1

A polyurethane urea elastic yarn was prepared in the same manner as in the preparation process of Example 1 except that polyethylene glycol was not mixed in the step of preparing a prepolymer.

Comparative Example 2

In the process of preparing the prepolymer of Example 1, 4.0 mol % of polyethylene glycol (molecular weight 2000) was mixed to 34.2 kg of polytetramethylene ether glycol (PTMG, molecular weight 1800), and after adding 8.8 kg of 4,4'-diphenylmethane diisocyanate thereto, the result was reacted while stirring for 120 minutes at 90° C. in a nitrogen gas stream to prepare a polyurethane prepolymer having isocyanate on both terminals. The preparation process after that was the same as in Example 1.

Comparative Example 3

In the process of preparing the prepolymer of Example 1, 21.0 mol % of polyethylene glycol (molecular weight 2000) was mixed to 27.8 kg of polytetramethylene ether glycol (PTMG, molecular weight 1800), and after adding 8.7 kg of 4,4'-diphenylmethane diisocyanate thereto, the result was reacted while stirring for 120 minutes at 90° C. in a nitrogen gas stream to prepare a polyurethane prepolymer having isocyanate on both terminals. The preparation process after that was the same as in Example 1.

Experimental Example

Each of the spandex manufactured in the examples and the comparative examples was dyed with a black color acid dye, and the degree of dyeability (darkness) was measured as a brightness ($L^*$) value after dyeing, and comparatively evaluated.

The evaluation results are compared and shown in the following Table 1.

Herein, the $L^*$ value, which is the degree of dyeability, was measured by measuring reflectivity of the yarn using a spectrophotometer, and the measured value was calculated using a calculation formula of the CIE Lab color difference formula.

TABLE 1

|  | Polyethylene Glycol Content | $L^*$ Value | Modulus [g] | Spinning Workability |
| --- | --- | --- | --- | --- |
| Example 1 | 5.0 mol % | 34 | 7.6 | Favorable |
| Example 2 | 10.0 mol % | 10 | 7.4 | Favorable |
| Example 3 | 20.0 mol % | 6 | 7.0 | Favorable |
| Comparative Example 1 | Not Added | 76 | 8.1 | Favorable |
| Comparative Example 2 | 4.0 mol % | 52 | 7.9 | Favorable |
| Comparative Example 3 | 21.0 mol % | 5 | 6.6 | Poor |

※$L^*$ value: in the $L^*a^*b^*$ color difference values, the $L^*$ value is a value representing brightness, and when dyeing with the same dye, a lower $L^*$ value is obtained as the color is darker.

From the above-described experimental results, it was identified that significantly superior dyeability was obtained in the examples according to the present disclosure compared to in the comparative examples. In addition, it was identified that there was a critical significance for the amount of the polyethylene glycol used according to the present disclosure.

Comparative Example 3 had problems in that modulus of the yarn decreased due to the excessive addition of polyethylene glycol, and the use in the process was difficult due to poor workability during the spinning.

Comparative Example 2 had a problem in that the $L^*$ value of the yarn significantly increased due to the insufficient addition of polyethylene glycol, which leaded to poor dyeability.

The invention claimed is:

1. A polyurethane urea elastic yarn, the yarn comprising (a) a polyol including a first polyol and a second polyol; (b) at least one diisocyanates selected from the group consisting of 4,4'-diphenylmethane diisocyanate, hexamethylene diisocyanate, toluene diisocyanate, butylene diisocyanate, and hydrogenated p,p-methylene diisocyanate; (c) at least one diamine chain extenders selected from the group consisting of ethylenediamine, 1,2-propanediamine, 1,3-propanediamine, 1,2-butanediamine, 1,3-butanediamine, 1,4-butadediamine, 1,6-hexanediamine, 2,2-dimethyl-1,3-diaminopropane, 2,4-diamino-1-methykyclohexane, 2-methyl-1,5- pentanediamine, 1,5-diaminopentane, 1,4-cyclohexanediamine, m-xylylenediamine, and mixtures thereof; and (d) at least one amine chain terminators selected from the group consisting of diethylamine, cyclohexylamine, n-hexylamine, and mixtures thereof, wherein the second polyol is polyethylene glycol;

wherein the second polyol is mixed in 5.0 mol % to 20.0 mol % with respect to the total amount of the polyol, and the first polyol and the second polyol are materials different from each other, and the first polyol comprise at least one polytetramethylene ether glycol, propylene glycol or polycarbonate diol, wherein the polyurethane urea elastic yarn has an amine-terminated number of 20.0 meg/kg to 45.0 meg/kg.

2. The polyurethane urea elastic yarn of claim 1, wherein the polyurethane urea elastic yarn is spun in spinning solution comprising at least one of sterically-hindered phenol-based compound, a benzofuranone-based compound, a semicarbazide-based compound, a benzotriazole-based compound or a polymeric tertiary amine stabilizer.

* * * * *